(12) United States Patent
Tanimoto

(10) Patent No.: US 6,525,614 B2
(45) Date of Patent: Feb. 25, 2003

(54) VOLTAGE BOOST SYSTEM HAVING FEEDBACK CONTROL

(75) Inventor: Takashi Tanimoto, Gifu-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/995,976

(22) Filed: Nov. 16, 2001

(65) Prior Publication Data

US 2002/0060917 A1 May 23, 2002

(30) Foreign Application Priority Data

Nov. 17, 2000 (JP) .................................... 2000-351247

(51) Int. Cl.[7] ................................................. H03L 7/00
(52) U.S. Cl. ....................................................... 331/20
(58) Field of Search ...................... 363/60, 59; 327/536, 327/157, 159; 331/14, 11, 17, 20; 348/540

(56) References Cited

U.S. PATENT DOCUMENTS 4,293,874 A * 10/1981 Reneau ......................... 348/697
5,614,870 A * 3/1997 Sauer et al. .................. 327/157

* cited by examiner

Primary Examiner—Shawn Riley
(74) Attorney, Agent, or Firm—Fish & Richardson P.C.

(57) ABSTRACT

A voltage boost system for smoothly converging an output voltage of a voltage booster when feedback controlling the output voltage. The voltage boost system includes a voltage booster to increase an input voltage and generate a boosted output voltage. A feedback control circuit is connected to the voltage booster to compare first and second voltages, which are based on either one of an output voltage of the voltage booster and a reference voltage, with a third voltage, which is based on the other one of the output voltage and the reference voltage. The feedback control circuit generates a feedback signal based on the comparison to feedback control the voltage booster. The feedback control circuit maintains the feedback signal at a constant value when the third voltage is included between the first and second voltages.

13 Claims, 5 Drawing Sheets

VOLTAGE BOOST SYSTEM HAVING FEEDBACK CONTROL

BACKGROUND OF THE INVENTION

The present invention relates to a voltage boost system, and more particularly, to a voltage boost system that includes a feedback control circuit to stabilize the output of a voltage booster.

A voltage booster is used in electronic devices to generate different drive voltages from a sole power supply. A charge pump circuit, which includes a plurality of switching transistors and a capacitor, is one example of a voltage booster. The switching transistors are connected in series between an output terminal and a reference potential terminal of the charge pump circuit. One terminal of the capacitor is connected to a node between the series-connected transistors. FIG. 1 is a circuit diagram of a prior art charge pump circuit 50.

The charge pump circuit 50 includes switching transistors T1, T2, each of which are p-channel MOS transistors, a capacitor C1, and an output capacitor Cout. The capacitor C1 is provided with a cyclic clock CLK. Based on a pulse-height value VDD of the clock CLK, the capacitor C1 generates output voltage Vout, which has a maximum voltage of "−VDD". FIG. 2 illustrates the transition of the output voltage Vout, node potential Vn1, and the clock CLK in the charge pump circuit 50.

To control the output voltage at a predetermined voltage, the charge pump circuit employs a circuit that feedback controls the clock signal based on the output voltage. The feedback control circuit normally includes a circuit for comparing the output voltage of the charge pump circuit with a certain reference voltage. Based on the comparison, the feedback control circuit controls the pulse number or pulse width of the clock signal applied to the charge pump circuit.

If the output voltage is lower than a desired value, the feedback control circuit increases the pulse number or the pulse width of the clock signal to increase the voltage boost rate of the charge pump circuit. The voltage boost rate is the increased amount of the charge pump circuit output voltage per unit time and takes a negative value when the output voltage decreases. If the output voltage exceeds the desired voltage, the feedback control circuit decreases the pulse number or the pulse width of the clock signal to decrease the voltage boost rate of the charge pump circuit.

The output voltage is controlled at the desired voltage by altering the voltage boost rate of the charge pump circuit based on the comparison between the output voltage of the charge pump circuit and a certain reference voltage.

Such feedback control generates the desired output voltage. However, a certain length of time is required for the output voltage to converge to the desired voltage. During the converging period, a fluctuating component of the output voltage produces an oscillation noise. The output voltage increases and decreases about the desired voltage.

Accordingly, when such voltage boost system is employed in, for example, a drive circuit of a CCD imaging device, the oscillation noise may be superimposed with an imaging signal. This may cause the noise to appear on a display.

The problem with noise applies not only to charge pump circuits but also to voltage boost systems that stabilize the output voltage of a voltage booster by performing feedback control.

SUMMARY OF THE INVENTION

It is an object of the present invention to provide a voltage boost system that smoothly converges the output voltage of a voltage booster when feedback controlling the output voltage.

To achieve the above object, the present invention provides a voltage boost system including a voltage booster for boosting an input voltage to generate a boosted output voltage. A feedback control Circuit is connected to the voltage booster to compare first and second voltages, which are based on one of an output voltage of the voltage booster and a reference voltage, with a third voltage, which is based on the other one of the output voltage and the reference voltage, to generate a feedback signal based on the comparison to feedback control the voltage booster. The feedback control circuit maintains the feedback signal at a constant value when the third voltage is included between the first and second voltages.

A further perspective of the present invention is a method for comparing an output voltage of a voltage booster with a reference voltage and feedback controlling a boost rate of the voltage booster in accordance with the comparison result. The method includes setting a first and a second voltages, which are based on one of the output voltage of the voltage booster and the reference voltage, comparing the first and second voltages with a third voltage, which is based on the other one of the output voltage of the voltage booster and the reference voltage, generating a feedback signal based on the comparison to feedback control the voltage booster, and maintaining the feedback signal at a constant value when the third voltage is included between the first and second voltages.

A further perspective of the present invention is a method for comparing an output voltage of a voltage booster with a reference voltage and feedback controlling a boost rate of the voltage booster in accordance with the comparison result. The voltage booster is connected to a drive circuit that drives a solid-state imaging device of an imaging apparatus. The solid-state imaging device generates an imaging signal including a horizontal scanning blanking period and a vertical scanning blanking period. The method includes setting a first and a second voltages, which are based on one of the output voltage of the voltage booster and the reference voltage, comparing the first and second voltages with a third voltage, which is based on the other one of the output voltage of the voltage booster and the reference voltage during at least either one of the horizontal scanning blanking period and the vertical scanning blanking period, generating a feedback signal based on the comparison to feedback control the voltage booster, feedback controlling the voltage booster based on the feedback signal during the blanking period, and maintaining the feedback signal at a constant value during the blanking period when the third voltage is included between the first and second voltages.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
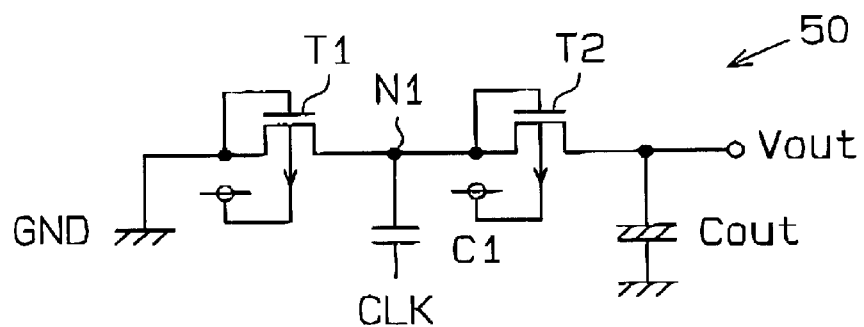
FIG. 1 is a circuit diagram of a prior art charge pump.
Figure 2:
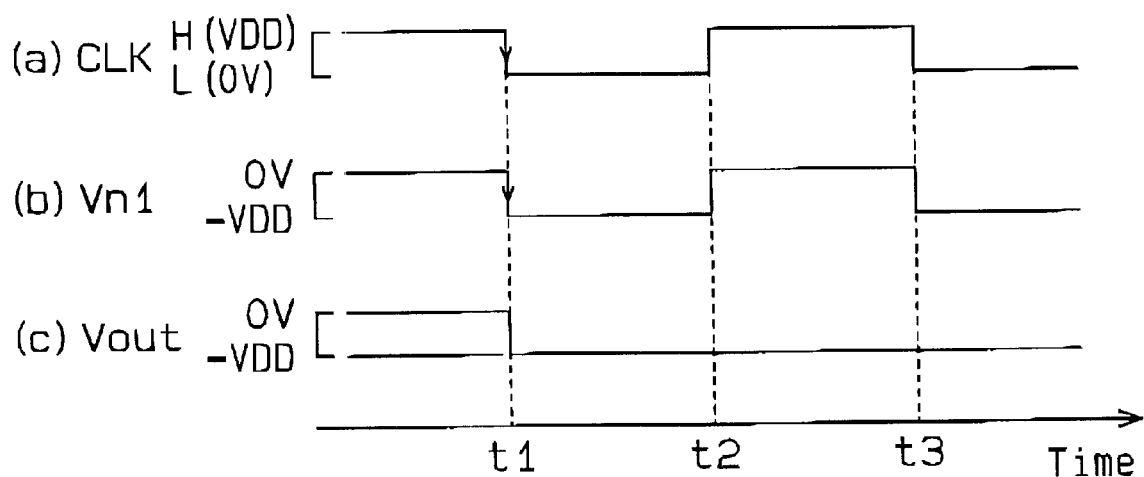
FIG. 2 is a time chart illustrating the operation of the charge pump of FIG. 1.

In the drawings, like numerals are used for like elements throughout.

First Embodiment

Figure 3:
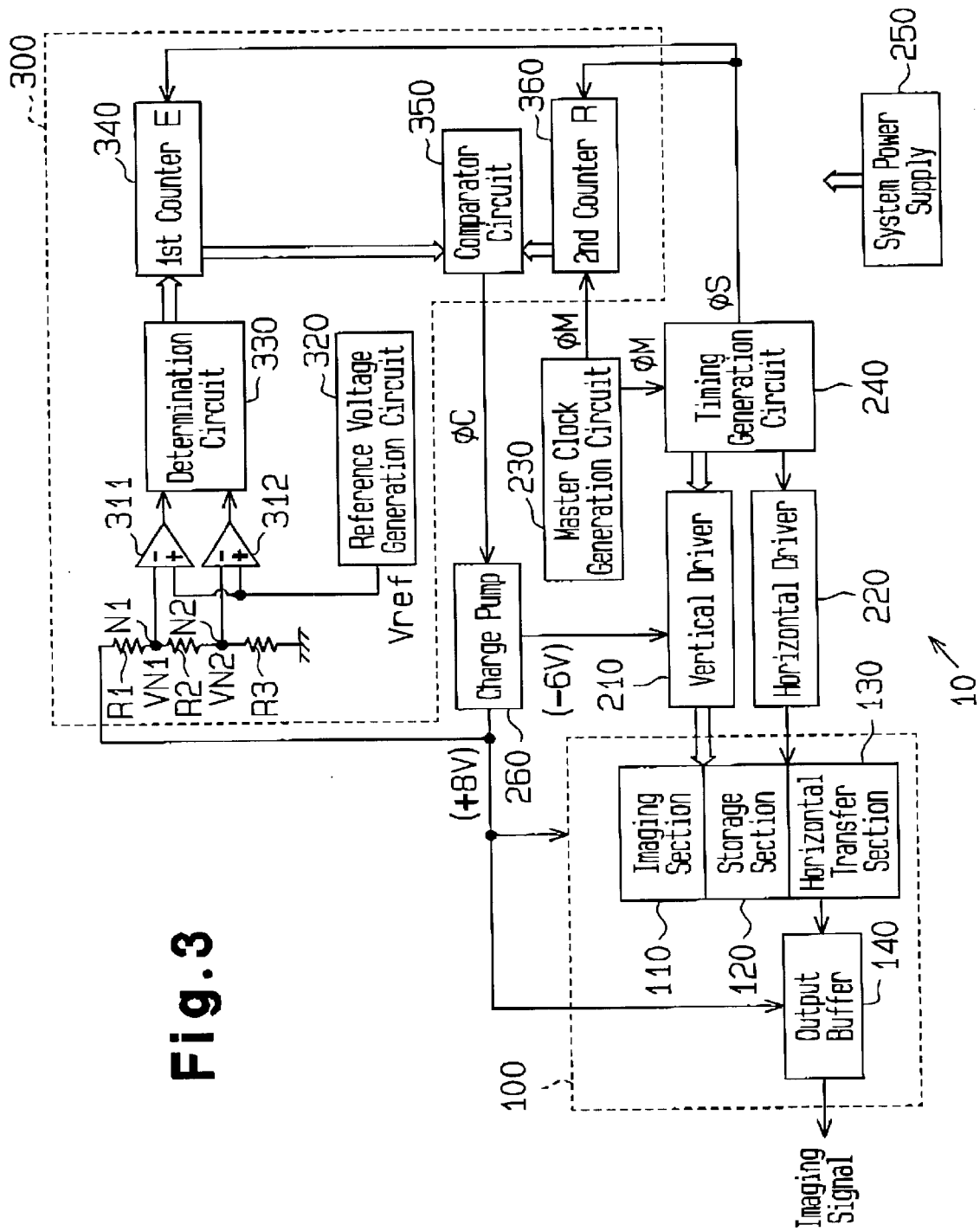
FIG. 3 is a schematic block diagram of a voltage boost system according to a first embodiment of the present invention.

FIG. 3 is a schematic block diagram of a voltage boost system 10 according to a first embodiment of the present invention. The voltage boost system 10 is incorporated in a charge-coupled device (CCD) imaging apparatus and connected to a CCD image sensor 100 of the CCD imaging apparatus.

The CCD image sensor 100 of FIG. 3 employs, for example, the frame transfer technique. The CCD image sensor 100 includes an imaging section 110, a storage section 120, a horizontal transfer section 130, and an output buffer 140.

The imaging section 110 performs photoelectric transfer. The storage section 120 temporarily stores charges that have undergone the photoelectric transfer. The horizontal transfer section 130 outputs the charges stored in the storage section 120. The output buffer 140 outputs the charges transferred from the horizontal transfer section 130 to a signal processing system (not shown).

As known in the art, the CCD image sensor 100 performs the following operations of:

(1) simultaneously transferring charges, which have undergone photoelectric-transfer in the imaging section 110, at a predetermined timing to the storage section 120 (vertical transfer);

(2) transferring the charges, which have been transferred and stored in the storage section 120, to the horizontal transfer section 130 one row at a time (horizontal transfer); and (3) outputting the charges transferred to the horizontal transfer section 130 through the output buffer 140.

The voltage boost system 10 includes a master clock generation circuit 230, a timing generation circuit 240, a system power supply 250, a charge pump 260, and a feedback control circuit 300.

a vertical driver 210 applies a vertical transfer drive pulse to each gate (not shown) of the imaging section 110 and the storage section 120 so that the CCD image sensor 100 performs a vertical transfer operation. The timing of the drive pulse is determined by a timing signal output from the timing generation circuit 240. The wave-height value of the drive pulse, or the pulse voltage, is obtained from the output voltage of the charge pump 260 (e.g., "−6V") and the power supply voltage of the system power supply 250 (e.g., "3.3V").

The charge pump 260 increases its input voltage (voltage boost clock voltage) in the negative and positive voltage directions based on a voltage boost clock (feedback signal) øC received from the feedback control circuit 300. The charge pump 260 preferably includes three voltage boosters (not shown), each of which has an n-channel MOS transistor and a capacitor, and an inverter circuit (not shown). The adjacent voltage boosters receive clocks that are logically inverted from each other by an inverter circuit. Each of the voltage boosters theoretically decreases the voltage corresponding to the voltage boost clock wave-height value (e.g., "3.3V") from the ground voltage. A voltage boost control circuit (not shown) controls the voltages generated by the three voltage boosters so that the voltages are maintained at, for example, the vicinity of "−6V".

The charge pump 260 includes a fourth voltage booster (not shown), which has a p-channel MOS transistor and a capacitor that are basically the same as those of FIG. 1. The fourth voltage booster uses the output voltage, which is maintained in the vicinity of "−6V", and the power supply voltage of the system power supply 250 to generate a pump output voltage Vout in the vicinity of, for example, "+8V". The pump output voltage Vout in the vicinity of "+8V" is used as a bias voltage of the CCD image sensor 100 or by the output buffer 140.

a horizontal driver 220 provides the CCD image sensor 100 with a horizontal transfer pulse. The output timing of the horizontal transfer pulse is also determined by the timing signal provided by the timing generation circuit 240. The horizontal transfer pulse wave-height value, or pulse voltage, is obtained only from the power supply voltage of the system power supply 250.

The configuration and feedback control of the feedback control circuit 300 will now be discussed. The feedback control performed when stabilizing, among the voltage boost outputs, the pump output voltage Vout of "+8V" will be described. The principle of the feedback control is the same as when stabilizing the pump output voltage Vout of "+8V". Thus, the stabilization of the output voltage of "−6V" will not be described.

The feedback control circuit 300 includes comparators 311, 312, A reference voltage generation circuit 320, a determination circuit 330, a first counter 340, a comparator circuit 350, and a second counter 360. The feedback control circuit 300 feedback controls the charge pump 260 to stabilize the output voltage of the charge pump 260.

To prevent the generation of noise caused by the fluctuation of the pump output voltage Vout, the pump output voltage Vout is controlled so that it is converged in a voltage range having a predetermined width ($\Delta V$). In the first embodiment, a first comparative voltage Vc1 and a second comparative example Vc2, which is greater than the first comparative example by $\Delta V$, is set. The feedback control circuit 300 feedback controls the pump output voltage Vout so that the pump output voltage Vout is held at a voltage included between the first comparative voltage Vc1 and the second comparative voltage Vc2.

More specifically, the feedback control circuit 300 decreases the voltage boost rate (voltage boost amount per unit time) of the charge pump 260 when the pump output voltage Vout is greater than the second comparative voltage Vc2. On the other hand, the feedback control circuit 300 increases the voltage boost rate of the charge pump 260 when the output voltage Vout is less than the first comparative voltage Vc1.

Referring to FIG. 3, the voltage between the pump output voltage Vout and the ground is divided by resistors R1, R2, R3. Node voltages VN1, VN2 generated by the voltage division are provided to the inverting input terminals of the comparators 311, 312 via nodes N1, N2, respectively. The non-inverting input terminals of the comparators 311, 312 are supplied with a reference voltage Vref from the reference voltage generation circuit 320, and the node voltages VN1, VN2 are compared with the reference voltage Vref.

The first comparative voltage Vc1 is a fixed value and takes the value of the pump output voltage Vout when the node voltage VN1 is equal to the reference voltage Vref. The second comparative voltage vc2 is a fixed value and takes the value of the pump output voltage Vout when the node voltage VN2 is equal to the reference voltage Vref. The first and second comparative voltages Vc1, Vc2 are represented by the reference voltage Vref, and the resistors R1, R2, R3 below.

Vc1≅Vref×(R1+R2+R3)/(R2+R3)

Vc2=Vref×(R1+R2+R3)/(R3)

In the first embodiment, the comparator 311 compares the node voltage VN1 and the reference voltage Vref. The comparison is equivalent to the comparison between the first comparative voltage Vc1 and the pump output voltage Vout. The comparator 312 compares the node voltage VN2 and the reference voltage Vref. The comparison is equivalent to the comparison between the second comparative voltage Vc2 and the pump output voltage Vout. The first comparative voltage Vc1 and the second comparative voltage Vc2 are set at a proper value by adjusting the values of the resistors R1, R2, R3 and the reference voltage Vref.

Based on the output of the comparators 311, 312, the determination circuit 330 determines whether to vary the voltage boost rate of the charge pump 260. The determination result of the determination circuit 330 is represented by "+1" when the pump output voltage Vout is greater than the second comparative example Vc2. The determination result of the determination circuit 330 is represented by "0" when the pump output voltage Vout is less than or equal to the second comparative example Vc2 and greater than or equal to the first comparative voltage Vc1. The determination result of the determination circuit 330 is represented by "-1" when the pump output voltage Vout is less than the first comparative example Vc1.

When the determination result is "+1" the voltage boost rate of the charge pump 260 is decreased. When the determination result is "0", the voltage boost rate of the charge pump 260 is maintained. When the determination result is "-1", the voltage boost rate of the charge pump 260 is increased.

The feedback control circuit 300 varies the voltage boost rate of the charge pump 260 by altering the duty ratio (feedback parameter) of the voltage boost clock øC, which is provided to the charge pump 260. The duty ratio is the ratio of the period during which the clock voltage is logically high with respect to the cycle of the voltage boost clock øC.

In the first embodiment, the voltage boost rate of the charge pump 260 is maximal when the duty ratio is 50%. As the duty ratio decreases from 50%, the voltage boost rate of the charge pump 260 decreases. Accordingly, the altering of the duty ratio of the voltage boost clock øC variably controls the voltage boost rate of the charge pump 260.

To variably control the voltage boost rate of the charge pump 260 in multiple stages, the determination result of the determination circuit 330 is added for each feedback cycle (cycle of voltage boost clock øC). The duty ratio of the voltage boost clock øC is set based on the sum of the determination results.

The sum of the determinations given by the determination circuit 330 for each feedback cycle is associated with a pulse number of a master clock øM. A period corresponding to the associated pulse number of the master clock øM is set as the period during which the voltage boost clock øC is logically high. The voltage boost clock øC has a predetermined cycle. The initial condition is set beforehand so that the period during which the voltage boost clock øC is logically high and the period during which the voltage boost clock øC is logically low are approximated in the same cycle.

More specifically, referring to FIG. 3, the determination result of the determination circuit 330 is provided to the first counter 340, which adds the determination results of the determination circuit 330 in every feedback cycle. The first counter 340 is activated when its enable terminal E is provided with an auxiliary clock øS from the timing generation circuit 240 in every feedback cycle. Based on the auxiliary clock øS, the first counter 340 adds the output value of the determination circuit 330 in every feedback cycle. The duty ratio of the voltage boost clock øC is altered based on the sum.

To alter the duty ratio, the second counter 360 is initialized each time its reset terminal R is provided with the auxiliary clock øS and starts counting the pulse number of the master clock øM from the beginning. The count value of the second counter 360 and the count value of the first counter 340 are provided to the comparator circuit (digital comparator circuit) 350.

The comparator circuit 350 generates the voltage boost clock øC at a low level when the count value of the second counter 360 is lower than that of the first counter 340. The comparator circuit 350 generates the voltage boost clock øC at a high level when the count value of the second counter 360 is greater than or equal to that of the first counter 340. In other words, the comparator circuit 350 generates the voltage boost clock øC with a duty ratio altered in accordance with the sum of the first counter 340.

Figure 4:
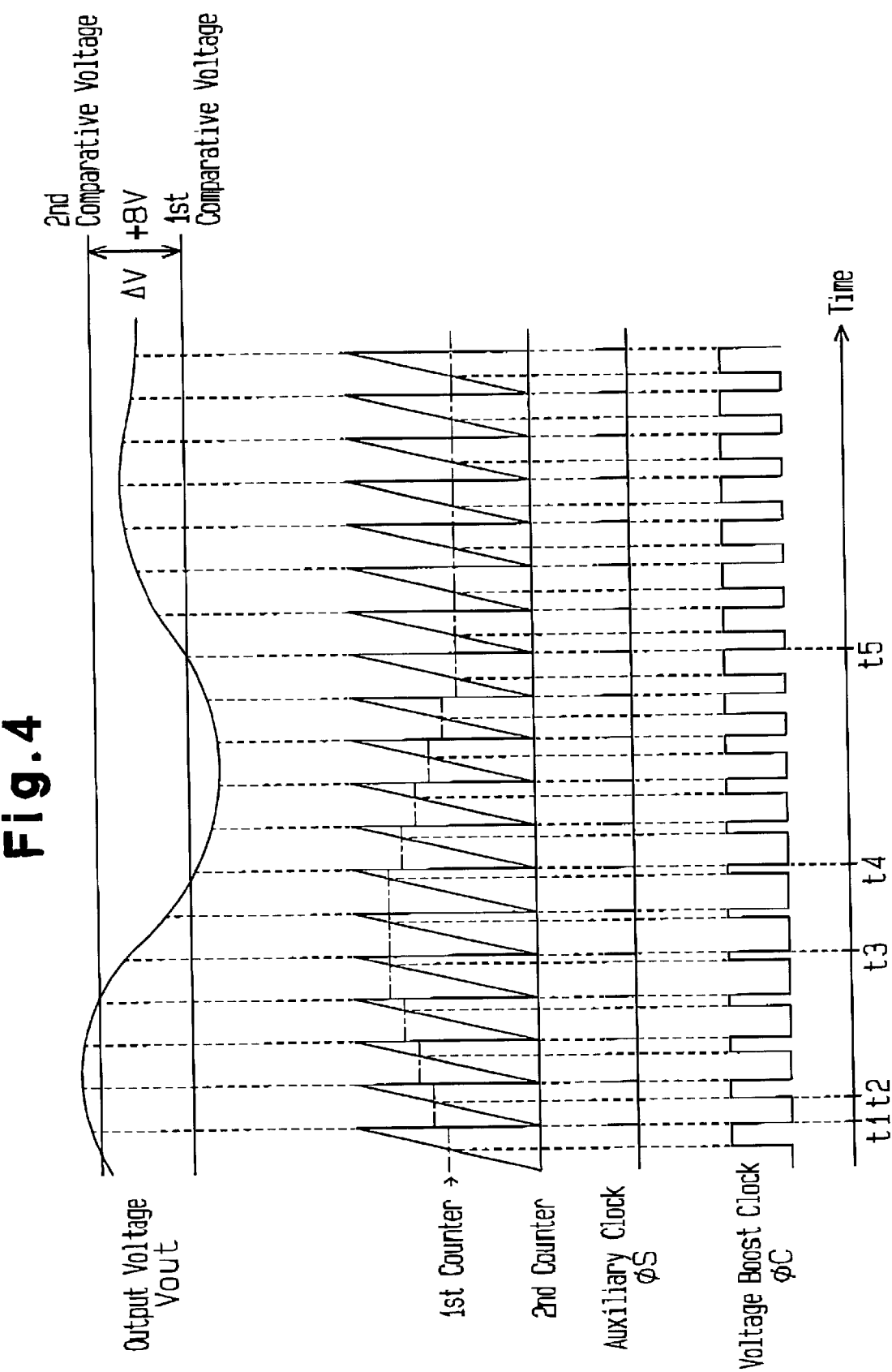
FIG. 4 is a time chart illustrating a voltage boost operation performed by the voltage boost system of FIG. 3.

The transition of the pump output voltage Vout will now be discussed with reference to FIG. 4.

At time t1, which is after the pump output voltage Vout exceeds the second comparison voltage Vc2, the counter value of the first counter 340, which is represented by the broken lines, is incremented when the first counter 340 receives the auxiliary clock øS. At time t2, which is when the count value of the second counter 360 becomes greater than that of the first counter 340, the voltage boost clock øC goes high. The duty ratio is controlled so that it decreases. This decreases the voltage boost rate of the charge pump 260.

The control for decreasing the voltage boost rate of the charge pump 260 continues until the pump output voltage Vout becomes less than or equal to the second comparison voltage Vc2. At time t3, which is after the pump output voltage Vout becomes less than or equal to the second comparison voltage Vc2, the first counter 340 maintains the same count value as the previous one even if the first counter 340 is provided with the auxiliary clock øS. In other words, when the pump output voltage Vout is included between the first and second comparative voltages Vc1, Vc2, the duty ratio is maintained at a constant value. That is, the voltage boost clock øC (feedback signal) is maintained at a constant value. This maintains the voltage boost rate of the charge pump 260 at a constant value.

Then, at time t4, which is after the output value Vout becomes less than or equal to the first comparative voltage Vc1, the counter value of the first counter 340 is decremented when the first counter 340 receives the auxiliary clock øS. In this case, the duty ratio of the voltage boost clock øC is increased to 50%.

Subsequent to time tS, the charge pump 260 is provided with the voltage boost clock øC, the duty ratio of which is maintained at a constant value, when the output voltage Vout is converged between the first and second comparative voltages Vc1, Vc2.

The voltage boost system 10 of the first embodiment has the advantages described below.

(1) The output voltage Vout of the charge pump 260 is controlled so that it is included between the first and second comparative voltages Vc1, Vc2. Thus, the voltage boost rate of the charge pump 260 is not excessively altered. Further, the output voltage Vout is quickly and smoothly converged to the desired voltage.

(2) A voltage included between the pump output voltage Vout and the ground is divided by resistors to generate the node voltages VN1, VN2. This enables the pump output voltage Vout to be compared with the first and second comparative voltages Vc1, Vc2, which are generated from the sole reference voltage.

(3) The variable control of the duty ratio of the voltage boost clock øC, which is provided to the charge pump 260, variably controls the voltage boost rate of the charge pump 260.

(4) The duty ratio of the voltage boost clock øC is altered in accordance with the pulse number of the master clock øM. This improves the controlling characteristic of the voltage boost clock øC and the master clock øM.

Second Embodiment

Figure 5:
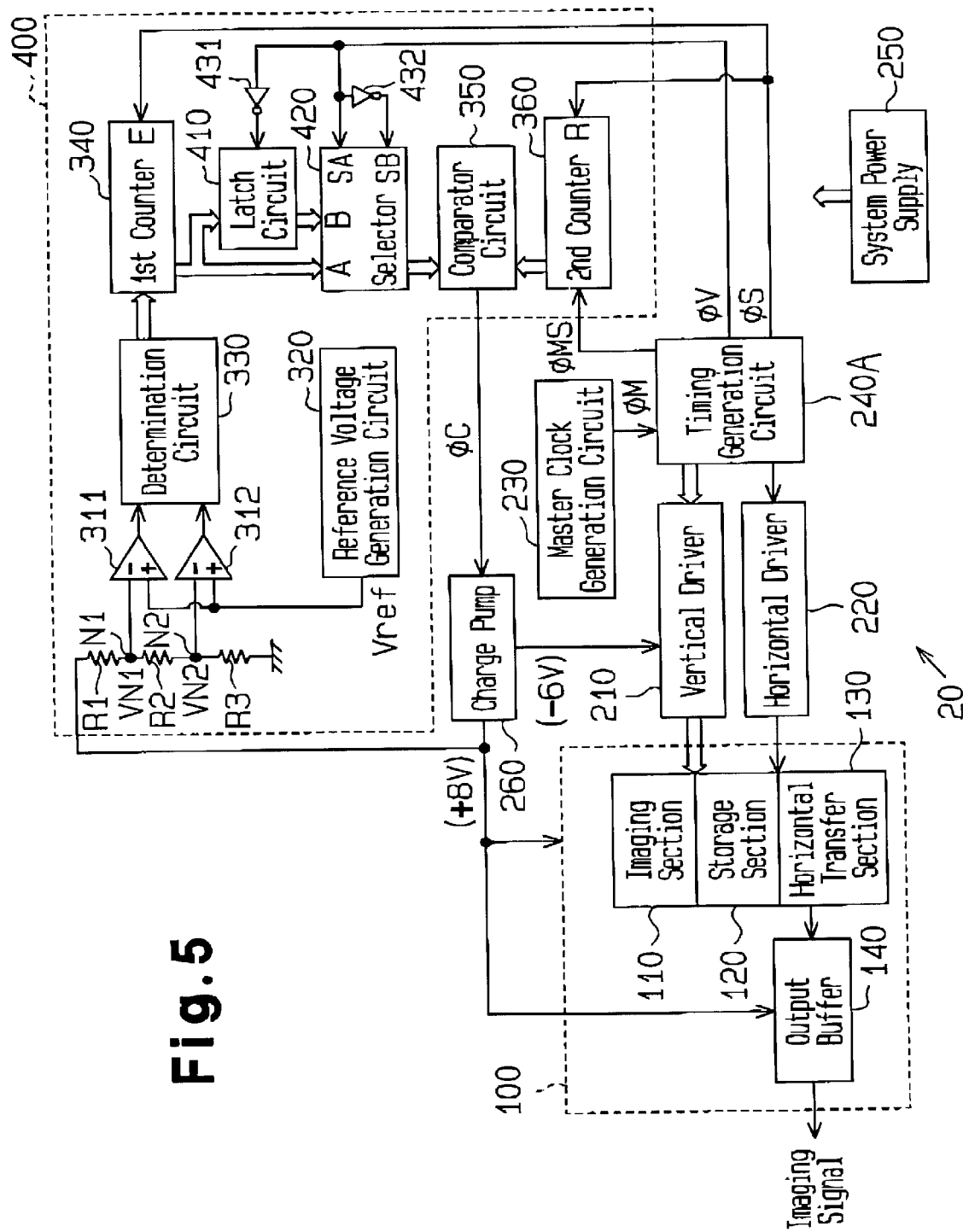
FIG. 5 is a schematic block diagram of a voltage boost system according to a second embodiment of the present invention.

FIG. 5 is a schematic block diagram of a voltage boost system 20 according to a second embodiment of the present invention. The voltage boost system 20 is also incorporated in a CCD imaging apparatus and connected to a CCD image sensor 100 of the CCD imaging apparatus.

Referring to FIG. 5, the voltage boost system 20 of the second embodiment differs from the voltage boost system 10 of the first embodiment only in feedback control circuits. The voltage boost system 20 has a feedback control circuit 400 including a latch circuit 410, a selector 420, and an inverter 432 in addition to the configuration of the feedback control circuit 300 in the voltage boost system 10 of the first embodiment.

In the second embodiment, the charge pump 260 performs the voltage boost operation only when the output of the imaging signal is stopped to prevent noise from mixing with the imaging signal output from the CCD image sensor 100.

If the voltage boost operation, which is feedback controlled, is performed only during periods when the output of the imaging signal is stopped, the voltage boost control may differ between each output stoppage period. Such difference in the voltage boost control may cause the output voltage Vout of the charge pump 260 to differ slightly between each period.

Particularly, if the voltage boost control is performed during horizontal blanking periods, which are provided in correspondence with the transfer of each line data, the pump output voltage Vout provided to the output buffer 140 differs between each horizontal blanking period. Accordingly, the voltage may differ between the transfer of each line data. As a result, the difference in the transfer voltage may produce lateral line-like noise on a display when the imaging data is reproduced. The lateral line-like noise is visually recognized. Thus, it is desired the production of the lateral line-like noise be prevented.

Accordingly, in the second embodiment, the voltage boost rate is not altered during a period (vertical scanning period) when a signal corresponding to a single image (assuming that the interlace technique is employed, a signal actually corresponding to a single field) is transferred.

Thus, the lateral line-like noise is not produced since the same control is performed during each horizontal blanking period.

In the feedback control circuit 400, the voltage between the pump output voltage Vout and the ground is divided by the resistors R1, R2, R3 to generate the node voltages VN1, VN2. The node voltages VN1, VN2 are compared with the reference voltage Vref. The comparison result is determined in three stages by the determination circuit 330. The first counter 340 counts the determination result in synchronism with the auxiliary clock øS.

The second counter 360 does not receive the master clock øM from the master clock generation circuit 230. The second counter 360 generates a low signal except when the output of the imaging signal is stopped. The second counter 360 receives a.clock øMS, which is synchronized with the master clock øM, only when the output of the imaging signal is stopped.

The first counter 340 provides its output signal to the comparator circuit 350 only during vertical blanking periods. A vertical blanking period is generated each time data corresponding to a single image is transferred. Thus, the comparator circuit 350 compares the counter value of the first counter 340 with the counter value of the second counter 360 in synchronism with the auxiliary clock øS only during the vertical blanking periods. When the output of the counter value of the first counter 340 to the comparator counter 350 is restricted, the comparator circuit 350 uses the counter value of the first counter 340 that was received immediately before the counter value output was restricted. Thus, the duty ratio of the voltage boost clock øC remains the same when a signal corresponding Lo a single image is output from the output buffer 140.

More specifically, a timing generation circuit 240A generates a permission signal øV, which goes high only during the vertical blanking periods. Based on the permission signal øV, the counter value of the counter 340 is provided to the comparator circuit 350. The permission signal øV is provided to the selector 420 and to the latch circuit 410 via the inverter 431. The latch circuit 410 receives the output signal of the first counter 340 and holds the output signal of the first counter 340 in synchronism with the trailing edge of the permission signal øV.

The selector 420 includes terminal A for receiving the output signal of the first counter 340 and terminal B for receiving the output signal of the latch circuit 410. Further, the selector 420 includes a switching terminal SA and a switching terminal SB. The switching terminal SA receives the permission signal øV, and the switching terminal SB receives the permission signal øV via the inverter 432.

The selector 420 connects terminal A and the comparator circuit 350 when the switching terminal SA is provided with the high permission signal øV. Further, the selector 420 connects terminal B and the comparator circuit 350 when the switching terminal SB is provided with the permission signal øV. Accordingly, during the vertical blanking period, the same feedback control as that in the first embodiment is performed. In periods other than the vertical blanking period, the voltage boost control is performed based on a constant duty ratio.

Figure 6:
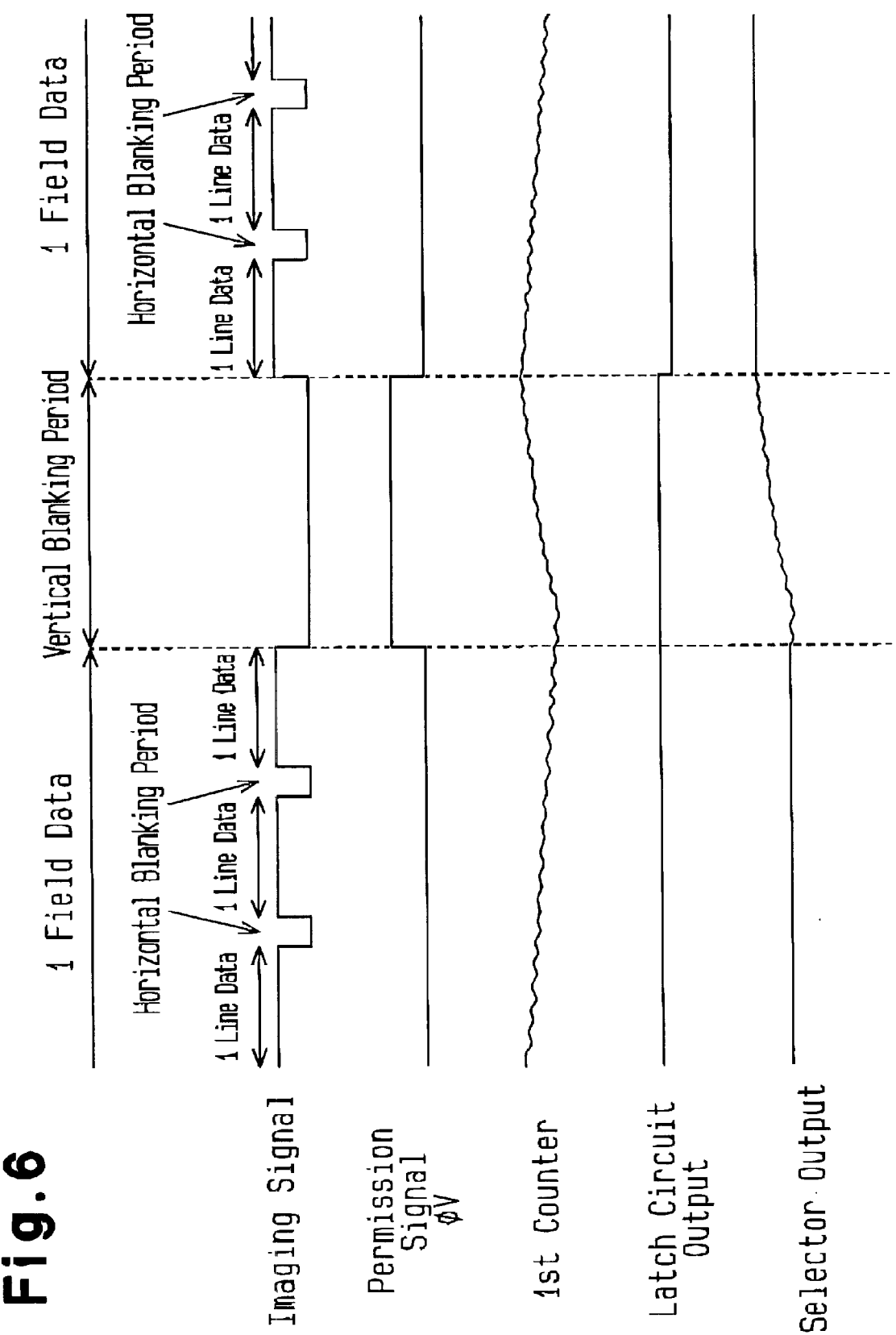
FIG. 6 is a time chart illustrating a voltage boost operation performed by the voltage boost system of FIG. 5.

The feedback control of the second embodiment will now be discussed in more detail with reference to FIG. 6.

The counter value of the first counter 340 is constantly updated in synchronism with the auxiliary clock øS. Since the permission signal øV is maintained at a low level in the same field, the output signal of the selector 420 is the same as the output signal of the latch circuit 410. Accordingly, in the same field, the voltage boost clock øC generated in each horizontal blanking period has the same duty ratio. Voltage boost control is performed based on such voltage boost clock øC.

Then, in the vertical blanking period, the permission signal øV goes high. Thus, the output signal of the selector 420 is the same as the output signal of the first counter 340. This feedback controls the charge pump 260 based on the clock cycle of the auxiliary clock øS.

When the vertical blanking period ends, the permission signal øV goes high. This updates the output signal of the selector 420 with the value of the first counter 340. Thus, the charge pump 260 is feedback controlled in accordance with the clock cycle of the auxiliary clock øS.

When the horizontal blanking period ends, the permission signal øV goes low. This updates the output signal of the latch circuit 410 with the value of the first counter 340. The selector 420 generates an output signal having the same value as the output signal of the updated latch circuit 410.

The voltage boost system of the second embodiment has the advantages described below.

(1) During the period in which the imaging signal is output, the charge pump 260 restricts changes in the voltage boost control of the charge pump 260 and maintains constant voltage boost control. Thus, lateral line-like noise is not produced during reproduction of an image signal.

(2) Voltage boost control is performed only when the output of the imaging signal is stopped (horizontal blanking periods). This prevents noise from mixing with the imaging signal.

By altering the duty ratio of the voltage boost clock øC to vary the voltage boost rate, variable control of the voltage boost rate is performed with higher accuracy in comparison to when, for example, varying the voltage boost rate by altering the pulse number of the voltage boost clock øC.

When altering the pulse number, the clock cycle may not be shortened much from the viewpoint of the response of transistors. Further, since voltage boost control is performed only during vertical blanking periods, if the clock cycle is too long, the number of pulses that may be altered in a single voltage boost cycle is small.

However, by altering the duty ratio, variable control in multiple stages is performed without shortening the clock cycle.

It should be apparent to those skilled in the art that the present invention may be embodied in many other specific forms without departing from the spirit or scope of the invention. Particularly, it should be understood that the present invention may be embodied in the following forms.

In the first embodiment, the voltage boost control of the charge pump 260 may be performed when the output of the imaging signal is stopped to prevent noise from mixing with the imaging signal. When voltage boost control of the charge pump 260 is not performed, the voltage boost clock øC may be stopped from being provided to the charge pump 260 or the master clock øM may be stopped from being provided to the second counter 360.

In the second embodiment, the output of the first counter 340 to the comparator circuit 350 may be restricted by providing the auxiliary clock øS to the enable terminal E of the first counter 340 only during the vertical blanking periods.

In the second embodiment, the output voltage Vout of the charge pump 260 in the same field may be monitored to set the duty ratio of the voltage boost clock øC in the next field based on the monitoring result. In this case, an integrator circuit adds the output of the first counter 340. A divider circuit divides the sum of the first counter 340 that is obtained in the same field by a predetermined value (e.g., the pulse number of the auxiliary clock øS in each field). The duty ratio of the voltage boost clock øC in the next field is determined based on the value calculated by the divider circuit. In this case, feedback control, which sets the voltage boost conditions based on the output voltage of the previous field, is enabled.

Comparison between the output voltage Vout of the charge pump 260 and the first and second comparative voltages Vc1, Vc2 may be performed by comparing two different reference voltages with a divisional voltage value of the output voltage Vout.

When the charge pump 260 undergoes voltage boost control, which is directed toward the negative voltage side, the absolute value of the output voltage of the charge pump 260 may be compared with a comparative voltage. In this case, feedback control is performed based on the comparison.

The charge pump 260 may be formed by a diode and a capacitor

The duty ratio of the voltage boost clock øC does not necessarily have to be based on the duty ratio of the master clock øM.

The variable control of the voltage boost rate may also be performed by altering the frequency (feedback parameter) of the voltage boost clock øC.

The control for increasing or decreasing the voltage boost rate of the charge pump 260 may be performed in an analog and continuous manner.

The voltage booster is not limited to the charge pump 260. The voltage boost system of the present invention may be applied to any voltage booster that has a feedback control circuit for stabilizing voltage boost output.

The present examples and embodiments are to be considered as illustrative and not restrictive, and the invention is not to be limited to the details given herein, but may be modified within the scope and equivalence of the appended claims.

What is claimed is:

1. A voltage boost system comprising:
    a voltage booster for boosting an input voltage to generate a boosted output voltage; and
    a feedback control circuit connected to the voltage booster for comparing first and second voltages, which are based on one of an output voltage of the voltage booster and
    a reference voltage, with a third voltage, which is based on the other one of the output voltage and the reference voltage, and for generating a feedback signal based on the comparison to feedback control the voltage booster, wherein the feedback control circuit is configured to maintain the feedback signal at a constant value when the third voltage is included between the first and second voltages.

2. The voltage boost system according to claim 1, wherein the feedback control circuit generates the first and second voltages based on the output voltage of the voltage booster and compares the first and second voltages with the reference voltage.

3. The voltage boost system according to claim 2, wherein the feedback control circuit includes:

a determination circuit for generating a determination result represented by "0" when the reference voltage is included between the first and second voltages and for generating a determination result represented by "+1" or "−1" when the reference voltage is not included between the first and second voltages; and a counter for adding the determination result of the determination circuit to generate a sum, wherein the feedback control circuit generates the feedback signal based on the sum of the counter.

4. The voltage boost system according to claim 1, wherein the first and second voltages respectively correspond to first and second reference voltages, and the feedback control circuit compares the first and second reference voltages with the third voltage, which is based on the output voltage of the voltage booster.

5. The voltage boost system according to claim 4, wherein the feedback control circuit includes:

a determination circuit for generating a determination result represented by "0" when the third voltage is included between the first and second reference voltages and for generating a determination result represented by "+1" or "−1" when the third voltage is not included between the first and second reference voltages; and a counter for adding the determination result of the determination circuit to generate a sum, wherein the feedback control circuit generates the feedback signal based on the sum of the counter.

6. The voltage boost system according to claim 1, wherein the feedback signal is a clock signal having a duty ratio, and the voltage booster is a charge pump operated based on the clock signal.

7. The voltage boost system according to claim 6, wherein a boost rate of the charge pump circuit is altered in accordance with the duty ratio of the clock signal.

8. The voltage boost system according to claim 1, wherein the voltage boost system is inserted into an imaging apparatus including a solid-state imaging device and a drive circuit that drives the solid-state imaging device, wherein the solid-state imaging device generates an imaging signal including a horizontal scanning blanking period and a vertical scanning blanking period, the voltage booster performs a boost operation during at least either one of the horizontal scanning blanking period and the vertical scanning blanking period, and provides the output voltage to the drive circuit.

9. The voltage boost system according to claim 8, wherein the imaging signal includes a plurality of vertical scanning periods, and the feedback control circuit maintains the feedback signal at a constant value in each of the vertical scanning periods regardless of the comparison result.

10. The voltage boost system according to claim 9, wherein the feedback control circuit holds the comparison result during a certain one of the vertical scanning periods and generates the feedback signal of the next vertical scanning period based on the held comparison result.

11. A method for comparing an output voltage of a voltage booster with a reference voltage and feedback controlling a boost rate of the voltage booster in accordance with the comparison result, the method comprising:

setting a first and a second voltages, which are based on one of the output voltage of the voltage booster and the reference voltage;

comparing the first and second voltages with a third voltage, which is based on the other one of the output voltage of the voltage booster and the reference voltage;

generating a feedback signal based on the comparison to feedback control the voltage booster; and maintaining the feedback signal at a constant value when the third voltage is included between the first and second voltages.

12. A method for comparing an output voltage of a voltage booster with a reference voltage and feedback controlling a boost rate of the voltage booster in accordance with the comparison result, wherein the voltage booster is connected to a drive circuit that drives a solid-state imaging device of an imaging apparatus, the solid-state imaging device generating an imaging signal including a horizontal scanning blanking period and a vertical scanning blanking period, the method comprising:

setting a first and a second voltages, which are based on one of the output voltage of the voltage booster and the reference voltage;

comparing the first and second voltages with a third voltage, which is based on the other one of the output voltage of the voltage booster and the reference voltage during at least either one of the horizontal scanning blanking period and the vertical scanning blanking period;

generating a feedback signal based on the comparison to feedback control the voltage booster;

feedback controlling the voltage booster based on the feedback signal during the blanking period; and maintaining the feedback signal at a constant value during the blanking period when the third voltage is included between the first and second voltages.

13. A voltage boost system comprising:

a voltage booster for boosting an input voltage to generate a boosted output voltage; and a feedback control circuit connected to the voltage booster for comparing first and second voltages, which are based on an output voltage of the voltage booster, with a third voltage, which is based on a reference voltage, and for generating a feedback signal based on the comparison to feedback control the voltage booster, wherein the feedback control circuit maintains the feedback signal at a constant value when the third voltage is included between the first and second voltage.

* * * * *